US005866005A

United States Patent [19]

DeSimone et al.

[11] Patent Number: 5,866,005

[45] Date of Patent: *Feb. 2, 1999

[54] CLEANING PROCESS USING CARBON DIOXIDE AS A SOLVENT AND EMPLOYING MOLECULARLY ENGINEERED SURFACTANTS

[75] Inventors: Joseph M. DeSimone, Chapel Hill; Timothy J. Romack, Durham; Douglas E. Betts, Chapel Hill; James B. McClain, Carrboro, all of N.C.

[73] Assignee: The University of North Carolina at Chapel Hill, Chapel Hill, N.C.

[ * ] Notice: The term of this patent shall not extend beyond the expiration date of Pat. No. 5,783,082.

[21] Appl. No.: 742,027

[22] Filed: Nov. 1, 1996

Related U.S. Application Data

[63] Continuation-in-part of Ser. No. 553,082, Nov. 3, 1995, Pat. No. 5,783,082.

[51] Int. Cl.[6] ........................................ B01D 11/00

[52] U.S. Cl. ........................ 210/634; 210/638; 134/10; 134/11

[58] Field of Search ............................ 210/634, 638, 210/767, 639, 636, 511, 748, 774; 134/10, 11, 13, 42, 188, 1

[56] References Cited

U.S. PATENT DOCUMENTS

| | | | |
|---|---|---|---|
| 4,219,333 | 8/1980 | Harris | 8/137 |
| 4,877,530 | 10/1989 | Moses | 210/511 |
| 4,933,404 | 6/1990 | Beckman et al. | 526/207 |
| 5,013,366 | 5/1991 | Jackson et al. | 134/10 |
| 5,158,704 | 10/1992 | Fulton et al. | 252/309 |
| 5,201,960 | 4/1993 | Starov | 134/11 |
| 5,213,619 | 5/1993 | Jackson et al. | 134/1 |
| 5,215,592 | 6/1993 | Jackson | 134/10 |
| 5,236,602 | 8/1993 | Jackson | 210/748 |
| 5,238,671 | 8/1993 | Matson et al. | 423/397 |
| 5,250,078 | 10/1993 | Saus et al. | 8/475 |
| 5,266,205 | 11/1993 | Fulton et al. | 210/639 |
| 5,267,455 | 12/1993 | Dewees et al. | 68/5 C |
| 5,269,815 | 12/1993 | Schlenker et al. | 8/475 |
| 5,298,032 | 3/1994 | Schlenker et al. | 8/475 |
| 5,306,350 | 4/1994 | Hoy et al. | 134/22.14 |
| 5,312,882 | 5/1994 | DeSimone et al. | 526/201 |
| 5,316,591 | 5/1994 | Chao et al. | 134/34 |
| 5,337,446 | 8/1994 | Smith et al. | 15/21.1 |
| 5,339,844 | 8/1994 | Stanford, Jr. et al. | 134/107 |
| 5,356,538 | 10/1994 | Wai et al. | 210/634 |
| 5,370,742 | 12/1994 | Mitchell et al. | 134/10 |
| 5,377,705 | 1/1995 | Smith, Jr. et al. | 134/95.3 |
| 5,412,958 | 5/1995 | Iliff et al. | 68/5 C |
| 5,474,812 | 12/1995 | Truckenmüller et al. | 427/430.1 |
| 5,486,212 | 1/1996 | Mitchell et al. | 8/142 |
| 5,501,761 | 3/1996 | Evans et al. | 156/344 |
| 5,505,219 | 4/1996 | Lansberry et al. | 134/105 |
| 5,509,431 | 4/1996 | Smith, Jr. et al. | 134/95.1 |
| 5,669,251 | 9/1997 | Townsend et al. | 68/58 |
| 5,676,705 | 10/1997 | Jureller et al. | 8/142 |
| 5,683,473 | 11/1997 | Jureller et al. | 8/142 |

FOREIGN PATENT DOCUMENTS

| | | | |
|---|---|---|---|
| 0 518 653 A1 | 6/1992 | European Pat. Off. . | |
| 0 518 653 A1 | 12/1992 | European Pat. Off. | D06L 1/02 |
| 0 620 270 A3 | 11/1994 | European Pat. Off. . | |
| 0 679 753 A2 | 4/1995 | European Pat. Off. . | |
| 0 711 864 A1 | 10/1995 | European Pat. Off. . | |
| 3904514A1 | 2/1989 | Germany | D06L 1/00 |
| 3906724A1 | 3/1989 | Germany | D06P 1/00 |
| 3906735A1 | 3/1989 | Germany | D06L 3/00 |
| 3906737A1 | 3/1989 | Germany | D06M 11/59 |
| 4004111A1 | 2/1990 | Germany | D06L 1/00 |
| 4344021A1 | 12/1993 | Germany | D06P 1/16 |
| 4429470A1 | 8/1994 | Germany | D06P 5/04 |
| WO 93/14255 | 1/1992 | WIPO | D06B 5/15 |
| WO 93/14259 | 1/1992 | WIPO | D06M 11/76 |
| WO 93/20116 | 10/1993 | WIPO . | |
| WO 96/27704 | 3/1995 | WIPO | D06L 1/00 |
| WO27704 | 9/1996 | WIPO . | |

OTHER PUBLICATIONS

E.E. Maury et al.; Graft Copolymer Surfactants for Supercritical Carbon Dioxide Applications, *Dept. of Chem., UNC.*

K.M. Motyl; Cleaning Metal Substrates Using Liquid/Supercritical Fluid Carbon Dioxide, *U.S. Dept. of Commerce, NTIS* pp. 1–31 (Jan. 1988).

K.A. Consani et al.; Observations on the Solubility of Surfactants and Related Molecules in Carbon Dioxide at 50° C., *J. of Supercritical Fluids* 3:51–65 (1990).

Z. Guan et al.; Fluorocarbon–Based Heterophase Polymeric Materials. 1. Block Copolymer Surfactants for Carbon Dioxide Applications, *Macromolecules* 27:5527–5532 (1994).

K. Harrison et al.; Water–in–Carbon Dioxide Microemulsions with a Fluorocarbon–Hydrocarbon Hybrid Surfactant, *Langmuir* 10:3536–3541 (1994).

F.A. Adamsky et al.; Inverse Emulsion Polymerization of Acrylamide in Supercritical Carbon Dioxide, *Macroemulsion* 27:312–314 (1994).

J.B. McClain et al.; Solution Properties of a $CO_2$–Soluble Fluoropolymer via Small Angle Neutron Scattering, *J. Am. Chem. Soc.* 118:917–918 (1996).

K.L. Harrison et al.; Effect of Surfactants on the Interfacial Tension between Supercritical Carbon Dioxide and Polyethylene Glycol, *Langmuir* 12:2637–2644 (1996).

M.L. O'Neill et al.; Polymer Stabilized Emulsions in Supercritical Carbon Dioxide, *PMSE* 74:228–229 (1996).

K.P. Johnston et al.; Water–in–Carbon Dioxide Microemulsions: An Environment for Hydrophiles Including Proteins, *Science* 271:624–626 (1996).

(List continued on next page.)

*Primary Examiner*—Ana Fortuna
*Attorney, Agent, or Firm*—Myers Bigel Sibley & Sajovec

[57] ABSTRACT

The separation of a contaminant from a substrate that carries the contaminant is disclosed. The process comprises contacting the substrate to a carbon dioxide fluid containing an amphiphilic species wherein the contaminant associates with the amphiphilic species and becomes entrained in the carbon dioxide fluid. The substrate is then separated from the carbon dioxide fluid, and then the contaminant is separated from the carbon dioxide fluid.

34 Claims, No Drawings

OTHER PUBLICATIONS

J.L. Fulton et al.; Aggregation of Amphiphilic Molecules in Supercritical Carbon Dioxide: A Small Angle X–ray Scattering Study, *Langmuir* (1995).

D. Betts et al.; The Tailoring of the Amphiphilic Nature of Surfactants for $CO_2$—The Concept of a Critical Micelle Density (CMD), *PMSE* 74 (1996).

D.A. Canelas et al.; Dispersion Polymerizations Stabilied Amphiphilic Diblock Copolymers in Supercritical Carbon Dioxide, *PMSE* 74 (1996).

K.A. Shaffer et al.; Dispersion Polymerizations in Carbon Dioxide Using Silozane–Based Stabilizers, *Macromolecules* 29, No. 7:2704–2706 (1996).

J.M. DeSimone et al.; Dispersion Polymerizations in Supercritical Carbon Dioxide, *Science* 265:356–359 (1994).

D.A. Canelas et al.; Dispersion Polymerization of Styrene in Supercritical Carbon Dioxide: Importance of Effective Surfactants, *Macromolecules* 29, No. 8:2818–2821 (1996).

K. Johnston et al., Pressure Tuning of Reverse Micelles for Adjustable Solvation of Hydrophiles in Supercritical Fluids, *Supercritical Fluid Science and Technology*, ACS Symposium Series 406, p. pp. 140–164, 1988.

G. McFann et al., Phase Behavior of AOT Microemulsions in Compressible Liquids, *J. Phys. Chem.* 95(12):4889–4896, 1991.

H. Jaspers et al., *Diacryl, A New High Performance Sytrene Free Vinyl Ester Resin*, 35th Annual Technical Conference, Reinforced Plastics/Composites Institute, the Society of the Plastics Industry, Inc., Section 10F, pp. 1–8, 1980.

P. Yazdi et al., Reverse Micelles in Supercritical Fluids. 2. Fluorescence and Absorpotion Spectral Probes of Adjustable Aggregatin in the Two–Phase Region, *J. Phys. Chem.*, 94(18):7224–7232, 1990.

G. McFann et al., Solubilization in Nonionic Reverse Micelles in Carbon Dioxide, *AIChE Journal*, 40(3):543–555, Mar. 1994.

CLEANING PROCESS USING CARBON DIOXIDE AS A SOLVENT AND EMPLOYING MOLECULARLY ENGINEERED SURFACTANTS

CROSS-REFERENCE TO RELATED APPLICATIONS

The instant application is a continuation-in-part of U.S. patent application Ser. No. 08/553,082 filed Nov. 3, 1995, now U.S. Pat. No. 5,873,082.

FIELD OF THE INVENTION

The present invention relates to a method of cleaning a contaminant from a substrate, and more particularly, to a method of cleaning a contaminant from a substrate using carbon dioxide and an amphiphilic species contained therein.

BACKGROUND OF THE INVENTION

In numerous industrial applications, it is desirable to sufficiently remove different contaminants from various metal, polymeric, ceramic, composite, glass, and natural material substrates such as those containing textiles. It is often required that the level of contaminant removal be sufficient such that the substrate can be subsequently used in an acceptable manner. Industrial contaminants which are typically removed include organic compounds (e.g., oil, grease, and polymers), inorganic compounds, and ionic compounds (e.g., salts).

In the past, halogenated solvents have been used to remove contaminants from various substrates and, in particular, chlorofluorocarbons have been employed. The use of such solvents, however, has been disfavored due to the associated environmental risks. Moreover, employing less volatile solvents (e.g., aqueous solvents) as a replacement to the halogenated solvents may be disadvantageous, since extensive post-cleaning drying of the cleaned substrate is often required.

As an alternative, carbon dioxide has been proposed to carry out contaminant removal, since the carbon dioxide poses reduced environmental risks. U.S. Pat. No. 5,316,591 proposes using liquified carbon dioxide to remove contaminants such as oil and grease from various substrate surfaces. Moreover, the use of carbon dioxide in conjunction with a co-solvent has also been reported in attempt to remove materials which possess limited solubility in carbon dioxide. For example, U.S. Pat. Nos. 5,306,350 and 5,377,705 propose employing supercritical carbon dioxide with various organic co-solvents to remove primarily organic contaminants.

In spite of the increased ability to remove contaminants which have limited solubility in carbon dioxide, there remains a need for carbon dioxide to remove a wide range of organic and inorganic materials such as high molecular weight non-polar and polar compounds, along with ionic compounds. Moreover, it would be desirable to remove these materials using more environmentally-acceptable additives in conjunction with carbon dioxide.

In view of the foregoing, it is an object of the present invention to provide a process for separating a wide range of contaminants from a substrate which does not require organic solvents.

SUMMARY OF THE INVENTION

These and other objects are satisfied by the present invention, which includes a process for separating a contaminant from a substrate that carries the contaminant. Specifically, the process comprises contacting the substrate to a carbon dioxide fluid containing an amphiphilic species so that the contaminant associates with the amphiphilic species and becomes entrained in the carbon dioxide fluid. The process may further comprise separating the substrate from the carbon dioxide fluid having the contaminant entrained therein, and then separating the contaminant from the carbon dioxide fluid.

The carbon dioxide fluid may be present in the supercritical, gaseous, or liquid phase. Preferably, the amphiphilic species employed in the carbon dioxide phase comprises a "$CO_2$-philic" segment which has an affinity for the $CO_2$. More preferably, the amphiphilic species further comprises a "$CO_2$-phobic" segment which does not have an affinity for the $CO_2$.

Various substrates may be cleaned in accordance with the invention. Exemplary substrates include polymers, metals, ceramics, glass, and composite mixtures thereof. Contaminants that may be separated from the substrate are numerous and include, for example, inorganic compounds, organic compounds, polymers, and particulate matter.

DETAILED DESCRIPTION OF THE PREFERRED EMBODIMENTS

The present invention is directed to a process for separating a contaminant from a substrate that carries the contaminant. Specifically, the process comprises contacting the substrate to a carbon dioxide fluid which contains an amphiphilic species. As a result, the contaminant associates with the amphiphilic species and becomes entrained in the carbon dioxide fluid. The process also comprises separating the substrate from the carbon dioxide fluid having the contaminant entrained therein, and then separating the contaminant from the carbon dioxide fluid.

For the purposes of the invention, carbon dioxide is employed as a fluid in a liquid, gaseous, or supercritical phase. If liquid $CO_2$ is used, the temperature employed during the process is preferably below 31° C. If gaseous $CO_2$ is used, it is preferred that the phase be employed at high pressure. As used herein, the term "high pressure" generally refers to $CO_2$ having a pressure from about 20 to about 73 bar. In the preferred embodiment, the $CO_2$ is utilized in a "supercritical" phase. As used herein, "supercritical" means that a fluid medium is at a temperature that is sufficiently high that it cannot be liquified by pressure. The thermodynamic properties of $CO_2$ are reported in Hyatt, *J. Org. Chem.* 49: 5097–5101 (1984); therein, it is stated that the critical temperature of $CO_2$ is about 31° C.; thus the method of the present invention should be carried out at a temperature above 31°.

The $CO_2$ fluid used in cleaning applications can be employed in a single or multi-phase system with appropriate and known aqueous and organic liquid components. Such components generally include a co-solvent or modifier, a co-surfactant, and other additives such as bleaches, optical brighteners, enzymes, rheology modifiers, sequestering agents, and chelants. Any or all of the components may be employed in the $Co_2$-based cleaning process of the present invention prior to, during, or after the substrate is contacted by the $CO_2$ fluid.

In particular, a co-solvent or modifier is a component of a $CO_2$-based cleaning formulation that is believed to modify the bulk solvent properties of the medium to which it is added. Advantageously, the use of the co-solvents in low polarity compressible fluids such as carbon dioxide have been observed to have a dramatic effect on the solvency of the fluid medium. In general, two types of co-solvents or modifiers may be employed, namely one which is miscible with the $CO_2$ fluid and one that is not miscible with the fluid. When a co-solvent is employed which is miscible with the $CO_2$ fluid, a single-phase solution results. When a co-solvent is employed which is not miscible with the $CO_2$ fluid, a multi-phase system results. Examples of suitable co-solvents or modifiers include, but are not limited to, liquid solvents such as water and aqueous solutions which may contain various appropriate water-soluble solutes. For the purposes of the invention, an aqueous solution may be present in amounts so as to be miscible in the $CO_2$-phase, or may be present in other amounts so as to be considered immiscible with the $CO_2$-phase. The term "aqueous solution" should be broadly construed to include water and other appropriate water-soluble components. The water may be being of various appropriate grades such as tap water or purified water, for example.

Exemplary solutes which may be used as co-solvents include, but are not limited to, alcohols (e.g., methanol, ethanol, and isopropanol); fluorinated and other halogenated solvents (e.g., chlorotrifluoromethane, trichlorofluoromethane, perfluoropropane, chlorodifluoromethane, and sulfur hexafluoride); amines (e.g., N-methyl pyrrolidone); amides (e.g., dimethyl acetamide); aromatic solvents (e.g., benzene, toluene, and xylenes); esters (e.g., ethyl acetate, dibasic esters, and lactate esters); ethers (e.g., diethyl ether, tetrahydrofuran, and glycol ethers); aliphatic hydrocarbons (e.g., methane, ethane, propane, ammonium butane, n-pentane, and hexanes); oxides (e.g., nitrous oxide); olefins (e.g., ethylene and propylene); natural hydrocarbons (e.g., isoprenes, terpenes, and d-limonene); ketones (e.g., acetone and methyl ethyl ketone); organosilicones; alkyl pyrrolidones (e.g., N-methyl pyrrolidone); paraffins (e.g., isoparaffin); petroleum-based solvents and solvent mixtures; and any other compatible solvent or mixture that is available and suitable. Mixtures of the above co-solvents may be used. The co-solvent or modifier can be used prior to, during, or after the substrate is contacted by the $CO_2$ fluid.

The process of the present invention employs an amphiphilic species contained within the carbon dioxide fluid. The amphiphilic species should be one that is surface active in the $CO_2$ fluid and thus creates a dispersed phase of matter which would otherwise exhibit low solubility in the carbon dioxide fluid. In general, the amphiphilic species partitions between the contaminant and the $CO_2$ phase and thus lowers the interfacial tension between the two components, thus promoting the entrainment of the contaminant in the $CO_2$ phase. The amphiphilic species is generally present in the carbon dioxide fluid from 0.001 to 30 weight percent. It is preferred that the amphiphilic species contain a segment which has an affinity for the $CO_2$ phase ("$CO_2$-philic"). More preferably, the amphiphilic species also contains a segment which does not have an affinity for the $CO_2$-phase ("$CO_2$-phobic") and may be covalently joined to the $CO_2$-philic segment.

Exemplary $CO_2$-philic segments may include a fluorine-containing segment or a siloxane-containing segment. The fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers,* 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctanesulfonamido) ethyl acrylate ("EtFOSEA"), 2-(N-ethylperfluorooctanesulfonamido) ethyl methacrylate ("EtFOSEMA"), 2-(N-methylperfluorooctanesulfonamido) ethyl acrylate ("MeFOSEA"), 2-(N-methylperfluorooctanesulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydroperfluoroalkylacrylate, 1,1',2,2'-tetrahydro perfluoroalkylmethacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used.

Exemplary $CO_2$-phobic segments may comprise common lipophilic, oleophilic, and aromatic polymers, as well as oligomers formed from monomers such as ethylene, α-olefins, styrenics, acrylates, methacrylates, ethylene and propylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles.

Amphiphilic species which are suitable for the invention may be in the form of, for example, random, block (e.g., di-block, tri-block, or multi-block), blocky (those from step growth polymerization), and star homopolymers, copolymers, and co-oligomers. Exemplary block copolymers include, but are not limited to, polystyrene-b-poly(1,1-dihydroperfluorooctyl acrylate), polymethyl methacrylate-b-poly(1,1-dihydroperfluorooctyl methacrylate), poly(2-dimethylamino)ethyl methacrylate)-b-poly(1,1-dihydroperfluorooctyl methacrylate), and a diblock copolymer of poly(2-hydroxyethyl methacrylate) and poly(1,l-dihydroperfluorooctyl methacrylate). Statistical copolymers of poly(1,1-dihydroperfluoro octyl acrylate) and polystyrene, along with poly(1,l-dihydroperfluorooctyl methacrylate) and poly(2-hydroxyethyl methacrylate) can also be used. Graft copolymers may be also be used and include, for example, poly(styrene-g-dimethylsiloxane), poly(methyl acrylate-g-1,1'dihydroperfluorooctyl methacrylate), and poly(1,1'-dihydroperfluorooctyl acrylate-g-styrene). Other examples can be found in I. Piirma, *Polymeric Surfactants* (Marcel Dekker 1992); and G. Odian, *Principals of Polymerization* (John Wiley and Sons, Inc. 1991). It should be emphasized that non-polymeric molecules may be used such as perfluoro octanoic acid, perfluoro(2-propoxy propanoic) acid, fluorinated alcohols and diols, along with various fluorinated acids, ethoxylates, amides, glycosides, alkanolamides, quaternary ammonium salts, amine oxides, and amines. Mixtures of any of the above may be used. Various components which are suitable for the process of the invention are encompassed by the class of materials described in E. Kissa, *Fluorinated Surfactants: Synthesis, Properties, and Applications* (Marcel Dekker 1994) and K. R. Lange Detergents and Cleaners: *A Handbook for Formulators* (Hanser Publishers 1994). For the purposes of the invention, two or more amphiphilic species may be employed in the $CO_2$ phase.

A co-surfactant may be used in the $CO_2$ phase in addition to the amphiphilic species. Suitable co-surfactants are those materials which typically modify the action of the amphiphilic species, for example, to facilitate the transport of contaminant molecules or material into or out of aggregates of the amphiphilic species. Exemplary co-surfactants that may be used include, but are not limited to, longer chain alcohols (i.e., greater than $C_8$) such as octanol, decanol, dodecanol, cetyl, laurel, and the like; and species containing two or more alcohol groups or other hydrogen bonding functionalities; amides; amines; and other like components. An example of a typical application is the use of cetyl alcohol as a co-surfactant in aqueous systems such as in the mini-emulsion polymerization of styrene using sodium lauryl sulfate as a surface active component. Suitable other types of materials that are useful as co-surfactants are well known by those skilled in the art, and may be employed in the process of the present invention. Mixtures of the above may be used.

Other additives may be employed in the carbon dioxide, preferably enhancing the physical or chemical properties of the carbon dioxide fluid to promote association of the amphiphilic species with the contaminant and entrainment of the contaminant in the fluid. The additives may also modify or promote the action of the carbon dioxide fluid on a substrate. Such additives may include, but are not limited to, bleaching agents, optical brighteners, bleach activators, corrosion inhibitors, enzymes, builders, co-builders, chelants, sequestering agents, rheology modifiers, and non-surface active polymeric materials which prevent particle redeposition. Mixtures of any of the above may be used. As an example, rheology modifiers are those components which may increase the viscosity of the $CO_2$ phase to facilitate contaminant removal. Exemplary polymers include, for example, perfluoropolyethers, fluoroalkyl polyacrylics, and siloxane oils. Additionally, other molecules may be employed including $C_1$–$C_{10}$ alcohols, $C_1$–$C_{10}$ branched or straight-chained saturated or unsaturated hydrocarbons, ketones, carboxylic acids, N-methyl pyrrolidone, dimethylacetyamide, ethers, fluorocarbon solvents, and chlorofluorocarbon solvents. For the purposes of the invention, the additives are typically utilized up to their solubility limit in the $CO_2$ fluid employed during the separation.

For the purposes of the invention, the term "cleaning" should be understood to be consistent with its conventional meaning in the art. Specifically, "cleaning" should encompass all aspects of surface treatment which are inherent in such processes. For example, in the cleaning of garments, the use of cationic surface active agents leads to their adsorption on the fibers in the textile fabric which reduces static electricity in the clothing that is cleaned. Although the adsorption might not be technically referred to as cleaning, Applicants believe that such phenomena are typically inherent in a vast majority of cleaning processes. Other examples include the use of low levels of fluorinated surface active agents in some aqueous systems for metal cleaning, the adsorption of which creates desirable surface properties in subsequent manufacturing steps, as well as the use of fabric softeners in fabric care formulations, the chemical action of bleaching agents on surfaces, or the protective stain resistant action imparted to surfaces by the use of silicone, fluorinated, or other low surface energy components in a cleaning or surface treatment formulation.

The process of the invention can be utilized in a number of industrial applications. Exemplary industrial applications include the cleaning of substrates utilized in metal forming and machining processes; coating processes; fiber manufacturing and processing; fire restoration; foundry applications; garment care; recycling processes; surgical implantation processes; high vacuum processes (e.g., optics); precision part cleaning and recycling processes which employ, for example, gyroscopes, laser guidance components and environmental equipment; biomolecule and purification processes; food and pharmaceutical processes; and microelectronic maintenance and fabrication processes. Processes relating to cleaning textile materials may also be encompassed including those, for example, which pertain to residential, commercial, and industrial cleaning of clothes, fabrics, and other natural and synthetic textile and textile-containing materials. Specific processes can relate to cleaning of materials typically carried out by conventional agitation machines using aqueous-based solutions. Additionally, processes of the invention can be employed in lieu of, or in combination with, dry cleaning techniques.

The substrates which are employed for the purposes of the invention are numerous and generally include all suitable materials capable of being cleaned. Exemplary substrates include porous and nonporous solids such as metals, glass, ceramics, synthetic and natural organic polymers, synthetic and natural inorganic polymers, composites, and other natural materials. Textile materials may also be cleaning according to the process of the invention. Various liquids and gel-like substances may also be employed as substrates and include, for example, biomass, food products, and pharmaceutical. Mixtures of solids and liquids can also be utilized including various slurries, emulsions, and fluidized beds.

In general, the contaminants may encompass materials such as inorganic compounds, organic compounds which includes polar and non-polar compounds, polymers, oligomers, particulate matter, as well as other materials. Inorganic and organic compounds may be interpreted to encompass oils as well as all compounds. The contaminant may be isolated from the $CO_2$ and amphiphilic species to be utilized in further downstream operations. Specific examples of the contaminants include greases; salts; contaminated aqueous solutions which may contain aqueous contaminants; lubricants; human residues such as fingerprints, body oils, and cosmetics; photoresists; pharmaceutical compounds; food products such as flavors and nutrients; dust; dirt; and residues generated from exposure to the environment.

The steps involved in the process of the present invention can be carried out using apparatus and conditions known to those who are skilled in the art. Typically, the process begins by providing a substrate with a contaminant carried thereon in an appropriate high pressure vessel. The amphiphilic species is then typically introduced into the vessel. Carbon dioxide fluid is usually then added to the vessel and then the vessel is heated and pressurized. Alternatively, the carbon dioxide and the amphiphilic species may be introduced into the vessel simultaneously. Additives (e.g., co-solvents, co-surfactants and the like) may be added at an appropriate time. Upon charging the vessel with $CO_2$, the amphiphilic species becomes contained in the $CO_2$. The $CO_2$ fluid then contacts the substrate and the contaminant associates with the amphiphilic species and becomes entrained in the fluid.

During this time, the vessel is preferably agitated by known techniques including, for example, mechanical agitation; sonic, gas, or liquid jet agitation; pressure pulsing; or any other suitable mixing technique. Depending on the conditions employed in the separation process, varying portions of the contaminant may be removed from the substrate, ranging from relatively small amounts to nearly all of the contaminant.

The substrate is then separated from the $CO_2$ fluid by any suitable method, such as by purging or releasing the $CO_2$ for example. Subsequently, the contaminant is separated from the $CO_2$ fluid. Any known technique may be employed for this step; preferably, temperature and pressure profiling of the fluid is employed to vary the solubility of the contaminant in the $CO_2$ such that it separates out of the fluid. In addition, the same technique may be used to separate the amphiphilic species from the $CO_2$ fluid. Additionally, a co-solvent, co-surfactant, or any other additive material can be separated. Any of the materials may be recycled for subsequent use in accordance with known methods. For example, the temperature and pressure of the vessel may be varied to facilitate removal of residual surfactant from the substrate being cleaned.

In addition to the steps for separating the contaminant described above, additional steps may be employed in the present invention. For example, prior to contacting the substrate with the $CO_2$ fluid, the substrate may be contacted with a pre-treatment formulation to facilitate subsequent removal of the contaminant from the substrate. For the purposes of the invention, the term "pre-treatment formulation" refers to an appropriate solvent, surface treatment, chemical agent, additive, or mixture thereof including, but not limited to, those recited herein. For example, a basic or acidic pre-treatment formulation may be useful. In general, the selection of the pre-treatment formulation to be used in this step often depends on the nature of the contaminant. As an illustration, a hydrogen fluoride or hydrogen fluoride mixture has been found to facilitate the removal of polymeric material, such as poly(isobutylene) films. In addition, pretreating or spotting agents are often added in many applications, such as in garment care, to facilitate removal of particularly difficult stains. Exemplary solvents for use in pre-treatment formulations are described in U.S. Pat. No. 5,377,705 to Smith, Jr. et al., the contents of which are incorporated herein by reference. Other suitable additives, pre-treatments, surface treatments, and chemical agents are known to those skilled in the art, and may be employed alone or in combination with other appropriate components for use as a pre-treatment formulation in the process of the invention.

The present invention is explained in greater detail herein in the following examples, which are illustrative and are not to be taken as limiting of the invention.

EXAMPLE 1

Synthesis of polystyrene b-PFOA

A polystyrene-b-PFOMA block copolymer is synthesized using the "iniferter" technique. The polystyrene macroiniferter is synthesized first.

Into a 50-mL round bottom flask, equipped with a stir bar is added 40 g deinhibited styrene monomer and 2.9 g tetraethylthiuram disulfide (TD). The flask is sealed with a septum and purged with argon. The flask is then heated for 11 hours at 65° C. in a constant temperature water bath. At the completion of the reaction, the polymer solution is diluted with tetrahydrofuran (THF) and precipitated into excess methanol. The polymer is collected by suction filtration and dried under vacuum. 13 g of polystyrene is obtained. The resulting polystyrene is purified twice by dissolving the polymer in THF and precipitating the polymer into excess methanol. The purified polymer has a molecular weight of 6.6 kg/mol and a molecular weight distribution ($M_w/M_n$) of 1.8 by GPC in THF.

The block copolymer is synthesized by charging 2.0 g of the above synthesized polystyrene macroiniferter into a 50-mL quartz flask equipped with a stir bar, along with 40 mL of a,a,a-trifluorotoluene (TFT) and 20 g of deinhibited 1,1-dihydroperfluorooctyl methacrylate (FOMA) monomer. The flask is sealed with a septum and purged with argon. The flask is then photolyzed for 30 hours at room temperature in a 16 bulb Rayonet equipped with 350 nm bulbs. At the end of the reaction, the reaction mixture is precipitated into cyclohexane, the polymer is collected and is dried under vacuum. 10 g of polymer is obtained. The block copolymer is purified by Soxhlet extraction using cyclohexane for two days. The block copolymer composition is determined to be 41 mol % polystyrene and 59 mol % PFOMA by $^1H$-NMR.

EXAMPLE 2

Synthesis of PFOA-co-polystyrene

A statistical copolymer of poly(1,1-dihydroperfluorooctyl acrylate) (PFOA) and polystyrene is synthesized by charging 6.1 g deinhibited FOA monomer, 1.4 g deinhibited styrene monomer, and 0.10 g AIBN into a 25-mL high pressure view cell equipped with a stir bar. The cell is then closed and purged with argon. After purging, the cell is heated to 60° C. and pressurized with $CO_2$ to 4900 psi. The reaction is run for 24 hours at which time the cell contents are vented into methanol, with the polymer being collected and dried under vacuum. 4.9 g of polymer is obtained consisting of 54 mol % polystyrene and 46 mol % PFOA as determined by $^1H$-NMR.

EXAMPLE 3

Synthesis of PMMA-b-PFOMA

A di-block copolymer of PMMA-b-PFOMA is synthesized using the atom transfer radical polymerization (ATRP) technique. The poly(methyl methacrylate) (PMMA) macroinitiator block is synthesized first.

Into a 50-mL round bottom flask equipped with a stir bar is added 20 g deinhibited MMA, 0.6 mL ($4\times10^{-3}$ mol) ethyl-2-bromoisobutyrate, 0.6 g ($4\times10^{-3}$ mol) copper(I) bromide, 1.9 g ($1.2\times10^{-4}$ mol) 2,2'-dipyridyl and 20 mL ethyl acetate. The flask is then capped with a septum and purged with argon. After purging, the flask is placed in a 100° C. oil bath for 5.5 hours. At the end of the reaction, the reaction mixture is diluted with ethyl acetate, passed through a short column of alumina, and precipitated into methanol. The polymer is then collected and dried under vacuum giving 15 g of polymer. The PMMA has a molecular weight of 8.1 kg/mol and a molecular weight distribution ($M_w/M_n$) of 1.3.

The block copolymer is subsequently prepared from the above synthesized PMMA macroinitiator. Into a 5-mL round bottom flask equipped with a stir bar is added 3.0 g ($3.8\times10^{-4}$ mol) of the above synthesized PMMA macroinitiator, 30 g deinhibited FOMA, 0.054 g ($3.8\times10^{-4}$ mol) copper(I) bromide, 0.18 g ($1.1\times10^{-3}$ mol) 2,2'-dipyridyl and 40 mL TFT. The flask is then sealed with a septum and purged with argon. After purging, the flask is placed in a 115° C. oil bath for 5.5 hours. At the end of the time, the reaction solution is diluted with fluorocarbon solvent, passed through a small column of alumina and precipitated into THF. The polymer is collected and dried under vacuum giving 7.5 g of polymer. The block copolymer is purified by Soxhlet extraction using THF for four days. $^1$H-NMR analysis of the block copolymer reveals it to consist of 40 mol % PMMA and 60 mol % PFOMA.

EXAMPLE 4

Synthesis of PDMAEMA-b-PFOMA

The poly(2-(dimethylamino)ethyl methacrylate) (PDMAEMA)-b-PFOMA diblock copolymer is synthesized using the iniferter technique. The PDMAEMA block is synthesized first and used as the macroiniferter for the second block.

Into a 50-mL quartz flask equipped with a stir bar is added 23.25 g deinhibited DMAEMA, 0.60 g N,N-benzyl dithiocarbamate, and 2.2 mg tetraethylthiuram disulfide. The flask is then sealed with a septum and purged with argon. After purging, the flask is photolyzed for 30 hours at room temperature in a 16 bulb Rayonet equipped with 350 nm bulbs. At the end of the reaction, the reaction mixture is diluted with THF and precipitated into hexanes. The polymer is collected and dried under vacuum giving a yield of 22 g.

The diblock copolymer is synthesized from the above synthesized PDMAEMA macroiniferter. Into a 50-mL quartz flask equipped with a stir bar is added 1.0 g of the above synthesized PDMAEMA macroiniferter, 25 mL of TFT, and 20 g deinhibited FOMA monomer. The flask is then sealed with a septum and purged with argon. After purging, the flask is photolyzed for 30 hours at room temperature in a 16 bulb Rayonet equipped with 350 nm bulbs. At the end of the reaction, the flask contents are diluted with TFT and precipitated into hexanes. The polymer is collected and dried under vacuum giving a yield of 7 g. The block copolymer is purified by Soxhlet extraction using methanol for three days. $^1$H-NMR reveals the block copolymer to consist of 17 mol % PDMAEMA and 83 mol % PFOMA. Thermal analysis gives two glass transitions for the block copolymer; one at about 25° C. and the other at about 51° C. corresponding to the PDMAEMA and PFOMA blocks respectively.

EXAMPLE 5

Synthesis of PFOMA-co-PHEMA

A statistical copolymer of PPOMA and poly(2-hydroxyethyl methacrylate) (PHEMA) is synthesized in carbon dioxide.

The copolymer of PFOMA and PHEMA is synthesized by charging 10.0 g deinhibited FOMA monomer, 1.0 g deinhibited HEMA monomer, and 0.01 g AIBN into a 25-mL high pressure view cell equipped with a stir bar. The cell is then closed and purged with argon. After purging, the cell is heated to 65° C. and pressurized with $CO_2$ to 5000 psig. The reaction is run for 51 hours after which the cell contents are vented into methanol, with the polymer being collected and dried under vacuum. 9.2 g of polymer is obtained consisting of 19 mol % PHEMA and 81 mol % PFOMA as determined by $^1$H-NMR. Thermal analysis reveals the polymer to have a single glass transition at about 37° C.

EXAMPLE 6

Synthesis of PHEMA-b-PFOMA

A di-block copolymer of PHEMA and PFOMA is synthesized using ATRP. The PHEMA block would be synthesized first using 2-(trimethylsilyloxy)ethyl methacrylate (HEMA-TMS).

Into a 25-mL round bottom flask equipped with a stir bar is added 10 g deinhibited HEMA-TMS, 0.29 g ($2\times10^{-3}$ mol) copper(I) bromide, 0.94 g ($6\times10^{-3}$ mol) 2,2'-dipyidyl, and 0.29 mL ($2\times10^{-3}$ mol) ethyl-2-bromoisobutyrate. The flask is then sealed with a septum and purged with argon. After purging, the flask is placed in a 120° C. oil bath for 5.5 hours after which time it is diluted with THF, passed through a short column of alumina, and precipitated into water. The polymer is collected and dried under vacuum to give a yield of 3.7 g. The polymer has a molecular weight of 7.2 kg/mol and a molecular weight distribution ($M_w/M_n$) of 1.8.

The second block of the copolymer is synthesized by dissolving a predetermined amount of the above synthesized PHEMA-TMS macroinitiator in TFT, adding an equal molar amount of copper(I) bromide, adding three times the molar amount of 2,2'-dipyridyl and adding a predetermined amount of FOMA monomer. The reaction flask is then sealed with a septum and purged with argon. After purging, the reaction flask is placed into an oil bath at 115° C. for several hours. The polymer is simultaneously isolated and deprotected by precipitation into acidic methanol. The polymer is collected and dried under vacuum. The resulting block copolymer is purified by Soxhlet extraction for several days.

EXAMPLE 7

Solubility of poly(DMAEMA-co-FOMA) in Supercritical Carbon Dioxide

The solubility of a statistical copolymer of 2-(dimethylamino)ethyl methacrylate (DMAEMA) and 1,1'-dihydroperfluorooctyl methacrylate (FOMA) containing 23 mol % DMAEMA in $CO_2$ is determined by adding 4 wt/vol of the copolymer to a high pressure view cell. The cell is then heated and $CO_2$ is added to the desired pressure. The copolymer is found to be completely soluble, forming a clear, colorless homogeneous solution at 65° C., 5000 psig; 40° C., 3600 psig; and also at 40° C., 5000 psig.

EXAMPLE 8

Solubility of poly(HEMA-co-FOMA) in Supercritical Carbon Dioxide

The solubility of a statistical copolymer of 2-(hydroxy) ethyl methacrylate (HEMA) and FOMA containing 19 mol % EMA is determined as in Example 1. At 4 wt/vol %, the copolymer forms a clear, colorless solution in $CO_2$ at 65° C., 5000 psig; 40° C., 3500 psig; and 40° C. 5000 psig.

EXAMPLE 9

Solubility of poly(VAc-co-FOA) in Supercritical Carbon Dioxide

The solubility of a block copolymer of vinyl acetate (VAc), and 1,1'-dihydroperfluorooctyl acrylate (FOA) is determined as in Example 1. The vinyl acetate block of the copolymer has a molecular weight ($M_n$) of 4.4 kg/mol, and the FOA block has a molecular weight of 43.1 kg/mol. The copolymer forms a clear, colorless solution at 52° C., 3450 psig and 40° C., 5000 psig, and a cloudy solution at 65° C., 5000 psig, and at 40° C., 3000 psig.

EXAMPLE 10

Solubility of poly(FOA-VAc-b-FOA) in Supercritical Carbon Dioxide

The solubility of an ABA triblock block copolymer of vinyl acetate (VAc), and 1,1'-dihydro perfluorooctyl acrylate (FOA) is determined as in Example 1. The vinyl acetate block of the copolymer has a molecular weight ($M_n$) of 7.1 kg/mol, and the FOA blocks have a total molecular weight of 108 kg/mol. The copolymer forms a clear, colorless solution at 65° C., 4900 psig, and at 28° C., 2400 psig.

EXAMPLE 11

Solubility of poly(DMAEMA-b-FOMA) in Supercritical Carbon Dioxide

The solubility of a block copolymer of DMAEMA and FOMA is determined as in Example 1. The copolymer contains 17 mol % DMAEMA. The copolymer forms a clear, colorless solution in $CO_2$ at 40° C., 5000 psig, and a slightly cloudy solution at 65° C., 5000 psig, and 40° C., 3600 psig.

EXAMPLE 12

Solubility of poly(Sty-b-POA) in Supercritical Carbon Dioxide

The solubility of a block copolymer of styrene (Sty) and FOA is determined as in Example 1. The molecular weight ($M_n$) of the styrene block is 3.7 kg/mol and the molecular weight of the FOA block is 27.5 kg/mol. The copolymer forms a slightly cloudy solution in $CO_2$ at 65° C., 5000 psig, and at 40° C., 5000 psig.

EXAMPLE 13

Solubility of poly(Sty-b-FOA) in Supercritical Carbon dioxide

The solubility of a block copolymer of styrene (Sty) and FOA is determined as in Example 1. The molecular weight ($M_n$) of the styrene block is 3.7 kg/mol and the molecular weight of the FOA block is 39.8 kg/mol. The copolymer forms a clear, colorless solution in $CO_2$ at 65° C., 5000 psig, and at 40° C., 5000 psig.

EXAMPLE 14

Solubility of poly(Sty-b-FOA) in Supercritical Carbon Dioxide

The solubility of a block copolymer of styrene (Sty) and FOA is determined as in Example 1. The molecular weight ($M_n$) of the styrene block is 3.7 kg/mol and the molecular weight of the FOA block is 61.2 kg/mol. The copolymer forms a clear, colorless solution in $CO_2$ at 40° C., 5000 psig and a slightly cloudy solution at 60° C., 5000 psig.

EXAMPLE 15

Synthesis of poly(hexafluoropropylene oxide-b-propylene oxide) Oligomeric Surfactant Acid fluoride terminated poly(hexafluoro-propylene oxide) oligomer is reacted with amine (or diamino) functional poly(propylene oxide) oligomer to form a low molecular weight block type surfactant for use in $CO_2$ applications.

EXAMPLE 16

Synthesis of Diethanolamide Functional Perfluoropolyether

Acid fluoride terminated poly(hexafluoro-propylene oxide) is treated with diethanol amine in the presence of triethylamine to prepare diethanolamide functional poly (hexafluoropropylene oxide) for use in $CO_2$ applications.

EXAMPLE 17

Characterization of poly(FOA-g-ethylene oxide) in Carbon Dioxide Using Scattering Techniques The solution and aggregation phenomena of a graft copolymer with a poly(FOA) backbone and poly(ethylene oxide) (PEO) grafts were investigated in supercritical $CO_2$ with and without water present. The copolymer contained 17 wt % PEO, and was found to aggregate strongly with and without water present, and to carry a significant amount of water into $CO_2$ under various conditions. These characteristics are indicative of surface activity.

EXAMPLE 18

Solution Properties of poly(FOA) in $CO_2$ in the Presence of a Non-Solvent (for PFOA) Co-Solvent An investigation of the solution properties of poly(FOA) in $CO_2$ as a function of the amount of co-solvent added using small angle neutron scattering techniques shows that small amounts of methyl methacrylate added to the system as a co-solvent improve the solubility of poly(FOA) in $CO_2$. The investigation also revealed that larger amounts (greater than 10%) adversely effects the solubility of poly(FOA) in $CO_2$. Experiments are carried out at 65° C., 5000 psig, 0.8 to 10 wt/vol % poly(FOA) and up to 20% methyl methacrylate added to the system. This data shows that the addition of small amounts of co-solvent relative to $CO_2$—even one that is a non-solvent for the targeted solute—can improve the solubility of a solute in $CO_2$.

EXAMPLE 19

Solution and Aggregation Behavior of poly(FOA-b-Sty) Copolymers in $CO_2$ as a Function of Co-Solvent An investigation of the behavior of three poly(FOA-b-Sty) block copolymers in $CO_2$ using scattering techniques shows that when sufficient styrene monomer is added to the system as a co-solvent. The block copolymers aggregate strongly (indicating surface activity) without added styrene and form solutions of unimers in the presence of enough styrene co-solvent. Three copolymers with compositions of PFOA/Sty (kg/mol) of 6.6/3.7, 24.5/4.5, and 35/6.6 are studied at concentrations of 2 and 4 wt/vol % copolymer with up to 20 wt/vol % added styrene over a range of pressures and temperatures.

EXAMPLE 20

Solution Behavior of poly(FOA-b-DMS) in $CO_2$

The solution behavior of a block copolymer containing a 27 kg/mol block of PDMS and a 167 kg/mol block of PFOA is shown to be well solvated and not to form aggregates in $CO_2$ at 25° C., 2880 psig and at 40° C., 5000 psig using scattering techniques.

EXAMPLE 21

Aggregation of poly(FOMA-b-Sty) in $CO_2$

A block copolymer containing blocks of 42 kg/mol poly (FOMA) and 6.6 kg/mol polystyrene is shown to form aggregates in $CO_2$, indicating surface activity similar to that of poly(FOA-b-Sty) copolymers of similar relative composition.

EXAMPLE 22

Solution and Aggregation Behavior of poly(DMS-b-Sty) Copolymers in $CO_2$ as a Function of Co-Solvent The solution and aggregation behavior of a block copolymer containing a block of 5 kg/mol polystyrene and a block of 25 kg/mol of poly(dimethyl siloxane) as a function of added co-solvent is studied using scattering techniques. Either isopropanol or styrene monomer are employed as co-solvent. With little or no co-solvent, small angle neutron scattering shows the formation of aggregates in the solution. As more co-solvent is added, the aggregates break up confirming that co-solvents and modifiers can indeed be employed to tune the surface activity of surfactants in $CO_2$ solutions.

EXAMPLE 23

Entrainment of $CO_2$-Insoluble Polystyrene Homopolymer into $CO_2$ Using poly(FOA-b-STY) Surfactant A $CO_2$-insoluble polystyrene sample is placed in a high pressure view cell and treated with a solution of poly(FOA-b-Sty) in supercritical $CO_2$. Examination of the original treating surfactant solution and the resulting dispersion of polystyrene in $CO_2$ using small angle neutron scattering confirms that the polystyrene is indeed entrained in the $CO_2$ by the block copolymer surfactant. Visual inspection of the 316 stainless steel surface where the $CO_2$-insoluble polystyrene was placed indicates that the surface has been cleaned of polystyrene.

EXAMPLE 24

Emulsification of Machine Cutting Fluid With Low Solubility in $CO_2$ Using Block Copolymers of poly (FOA) and polylvinyl acetate)

A machine cutting fluid which exhibits low solubility in $CO_2$ is emulsified in $CO_2$ using an ABA block copolymer surfactant, poly(FOA-b-Vac-b-FOA) with a 7.1 kg/mol vinyl acetate center block and 53 kg/mol (each) end blocks. A solution of several percent of the block copolymer surfactant and 20 wt/vol % of the cutting oil forms a milky white emulsion with no precipitated phase observed.

EXAMPLE 25

Solution Behavior of Polydimethyl Siloxane Homopolymer in $CO_2$ as a Function of Added Co-Solvent A small angle neutron scattering study of the solution properties of polydimethyl siloxane dissolved in $CO_2$ shows that in pure $CO_2$ at 65° C., and room temp (ca. 20° C.), 3500 psig shows that pure $CO_2$ is a thermodynamically poor solvent for the 33 kg/mol sample employed. Addition of isopropanol as a co-solvent results in a thermodynamically good solvent for the same sample under identical conditions. This result shows that even minor amounts of a co-solvent or modifier can alter the interactions of $CO_2$ with the $CO_2$-philic portion of an amphiphile designed for $CO_2$ applications.

EXAMPLE 26

Cleaning of poly(styrene) Oligomer from Aluminum

A 0.1271 g sample of $CO_2$ insoluble 500 g/mol solid poly(styrene) is added to a clean, preweighed aluminum boat which occupies the bottom one-third of a 25-mL high pressure cell. A 0.2485 charge of an amphiphilic species, a 34.9 kg/mol poly(1,1'-dihydroperfluorooctylacrylate)—b—6.6 kg/mol poly(styrene) block copolymer is added to the cell outside of the boat. The cell is equipped with a magnetically coupled paddle stirrer which provides stirring at a variable and controlled rate $CO_2$ is added to the cell to a pressure of 200 bar and the cell is heated to 40° C. After stirring for 15 minutes, four cell volumes, each containing 25 mL of $CO_2$ is flowed through the cell under isothermal and isobaric conditions at 10 mL/min. The cell is then vented to the atmosphere until empty. Cleaning efficiency is determined to be 36% by gravimetric analysis.

EXAMPLE 27

Cleaning of High Temperature Cutting Oil from Glass

A 1.5539 g sample of high temperature cutting oil was smeared on a clean, preweighed glass slide (1"×5/8×0.04") with a cotton swab. A 0.4671 g sample of Dow Corning® Q2-5211 surfactant and the contaminated glass slide are added to a 25-mL high pressure cell equipped with a magnetically coupled paddle stirrer. The cell is then heated to 40° C. and pressurized to 340 bar with $CO_2$. After stirring for 15 minutes, four cell volumes each containing 25 mL of $CO_2$ is flowed through the cell under isothermal and isobaric conditions at 10 mL/min. The cell is then vented to the atmosphere. Cleaning efficiency is determined to be 78% by gravimetric analysis.

EXAMPLE 28

Cleaning of poly(styrene) Oligomer from Glass

A 0.0299 g sample of polystyrene oligomer ($M_n$=500 g/mol) was smeared on a clean, preweighed glass slide (1"×5/8×0.04") with a cotton swab. A 0.2485 g charge of an amphiphilic species, a 34.9 kg/mol poly(1,1'-dihydroperfluorooctylacrylate)—b—6.6 kg/mol poly (styrene) block copolymer, and the contaminated glass slide are added to a 25-mL high pressure cell equipped with a magnetically coupled paddle stirrer. The cell is then heated to 40° C. and pressurized to 340 bar with $CO_2$. After stirring for 15 minutes, four cell volumes, each containing 25 mL of $CO_2$, is flowed through the cell under isothermal and isobaric conditions at 10 mL/min. The cell is then vented to the atmosphere. Cleaning efficiency is determined to be 90% by gravimetric analysis.

EXAMPLES 29–30

Cleaning of poly(styrene)oligomer from Aluminum Using Various Amphiphilic Species Examples 29–30 illustrate the cleaning of poly(styrene) oligomer from aluminum by employing different amphiphilic species.

EXAMPLE 31

The substrate described in Example 26 is cleaned utilizing perfluorooctanoic acid as the amphiphilic species.

EXAMPLE 32

The substrate described in Example 26 is cleaned utilizing perfluoro(2-propoxy propanoic) acid as the amphiphilic species.

EXAMPLES 33–45

Cleaning of various substrates

Examples 33–45 illustrate the cleaning of a variety of substrates by employing different amphiphilic species according to the system described in Example 26. The contaminants removed from the substrates include those specified and others which are known.

EXAMPLE 33

The system described in Example 26 is used to clean a photoresist with poly(1,1'-dihydroperfluorooctyl acrylate-b-methyl methacrylate) block copolymer. The photoresist is typically present in a circuit board utilized in various microelectronic applications. The cleaning of the photoresist may occur after installation and doping of the same in the circuit board.

EXAMPLE 34

The system described in Example 26 is used to clean the circuit board described in Example 6 with poly(1,1'-dihydroperfluorooctyl acrylate-b-vinyl acetate) block copolymer. Typically, the circuit board is cleaned after being contaminated with solder flux during attachment of various components to the board.

EXAMPLE 35

The system described in Example 26 is used to clean a precision part with poly(1,1'-dihydroperfluoro octyl methacrylate-b-styrene) copolymer. The precision part is typically one found in the machining of industrial components. As an example, the precision part may be a wheel bearing assembly or a metal part which is to be electroplated. Contaminants removed from the precision part include machining and fingerprint oil.

EXAMPLE 36

The system described in Example 26 is used to clean metal chip waste formed in a machining process with poly(1,1'-dihydroperfluorooctyl acrylate-co-styrene) random copolymer. Metal chip waste of this type is usually formed, for example, in the manufacture of cutting tools and drill bits.

EXAMPLE 37

The system described in Example 26 is used to clean a machine tool with poly(1,1'-dihydroperfluoro octyl acrylate-co-vinyl pyrrolidone) random copolymer. A machine tool of this type is typically used in the production of metal parts such as an end mill. A contaminant removed from the machine tool is cutting oil.

EXAMPLE 38

The system described in Example 26 is used to clean an optical lens with poly(1,1'-dihydroperfluoro octyl acrylate-co-2-ethylhexyl acrylate) random copolymer. An optical lenses especially suitable for cleaning include those employed, for example, in laboratory microscopes. Contaminants such as fingerprint oil and dust and environmental contaminants are removed from the optical lens.

EXAMPLE 39

The system described in Example 26 is used to clean a high vacuum component with poly(1,1'-dihydroperfluorooctyl acrylate-co-2-hydroxyethyl acrylate) random copolymer. High vacuum components of this type are typically employed, for example, in cryogenic night vision equipment.

EXAMPLE 40

The system described in Example 26 is used to clean a gyroscope with poly(1,1'-dihydroperfluorooctyl acrylate-co-dimethylaminoethyl acrylate) random copolymer. Gyroscopes of this type may be employed, for example, in military systems and in particular, military guidance systems. Contaminant removed from the gyroscope are various oils and particulate matter.

EXAMPLE 41

The system described in Example 26 is used to clean a membrane with poly(1,1'-dihydroperfluorooctylacrylate-b-styrene) block copolymer. Membranes of this type may be employed, for example, in separating organic and aqueous phases. In particular, the membranes in are especially suitable in petroleum applications to separate hydrocarbons (e.g., oil) from water.

EXAMPLE 42

The system described in Example 26 is used to clean a natural fiber with poly(1,1'-dihydroperfluorooctyl acrylate-b-methyl methacrylate) block copolymer. An example of a natural fiber which is cleaned is wool employed in various textile substrates (e.g., tufted carpet) and fabrics. Contaminants such as dirt, dust, grease, and sizing aids used in textile processing are removed from the natural fiber.

EXAMPLE 43

The system described in Example 26 is used to clean a synthetic fiber with poly(1,1'-dihydroper fluorooctyl acrylate-b-styrene) block copolymer. An example of a synthetic fiber which is cleaned is spun nylon employed solely, or in combination with other types of fibers in various nonwoven and woven fabrics. Contaminants such as dirt, dust, grease, and sizing aids used in textile processing are removed from the synthetic fiber.

EXAMPLE 44

The system described in Example 26 is used to clean a wiping rag used in an industrial application with poly(1,1'-dihydroperfluorooctyl acrylate-co-dimethylaminoethyl acrylate) random copolymer. Grease and dirt are contaminants removed from the wiping rag.

EXAMPLE 45

The system described in Example 26 is used to clean a silicon wafer with poly(1,1'-dihydroper fluorooctyl acrylate-co-2-hydroxyethyl acrylate) random copolymer. The silicon wafer may be employed, for example, in transistors which are used in microelectronic equipment. A contaminant which is removed from the silicon wafer is dust.

EXAMPLE 46

Utilization of Co-Solvent

The system described in Example 26 is cleaned in which a methanol cosolvent is employed in the $CO_2$ phase.

EXAMPLE 47

Utilization of Rheology Modifier

The system described in Example 26 is cleaned in which a rheology modifier is employed in the $CO_2$ phase.

EXAMPLE 48

Cleaning a Stainless Steel Sample

A coupon of 316 stainless steel is contaminated with a machine cutting fluid that exhibits very low solubility in carbon dioxide. The coupon is then placed in a high pressure cleaning vessel and cleaned with a mixture of carbon dioxide and a siloxane-based amphiphilic species. After the modified $CO_2$ cleaning process, the coupon is visually cleaned of cutting oil. A control experiment with pure $CO_2$ does not result in the cleaning of the cutting fluid from the coupon.

EXAMPLE 49

Cleaning a Textile Material With Water in $CO_2$

An International Fabricare Institute standard sample of cotton cloth stained with purple food dye is cleaned using a formulation of 2 wt/vol % of a siloxane-based ethoxylated amphiphilic species in liquid $CO_2$ at room temperature with 2 wt/vol % of water added as a modifier. After cleaning, the purple stained cotton cloth is visibly much cleaner and has lost most of the purple color. Controls run using amphiphilic species or water alone with $CO_2$ showed no significant removal of the food dye stain from the cloth.

EXAMPLE 50

Cleaning a Textile Material With Water and a Co-Solvent in Liquid $CO_2$

A purple food dye stained standard fabric is cleaned using a procedure similar to Example 49 except that the $CO_2$-based cleaning formulation employs 2 wt/vol % of the siloxane-based ethoxylate amphiphilic species, 2 wt/vol % water, and 10 wt/vol % isopropanol co-solvent in liquid $CO_2$ at room temperature. After cleaning, no trace of the purple food dye was visible on the cloth sample.

EXAMPLE 51

Cleaning a Textile Material

A purple food dye stained standard fabric sample is cleaned using a procedure similar to Example 49 except that the $CO_2$-based cleaning formulation employs ethanol as the co-solvent instead of isopropanol. The purple food dye was substantially removed by the $CO_2$-fluid cleaning process.

EXAMPLE 52

Cleaning a Machine Part in a Multi-Component System

A machine part is placed in a high pressure view cell and is treated with supercritical $CO_2$ fluid containing an amphiphilic species, co-solvent, co-surfactant, and corrosion inhibitor. The treated machine part displays less contaminant than prior to contact with the above fluid.

EXAMPLE 53

Cleaning a Fabric in a Multi-Component System

A soiled fabric sample is placed in a high pressure view cell and is treated with supercritical $CO_2$ fluid containing an amphiphilic species, co-solvent, co-surfactant, and bleaching agent. The treated fabric sample is cleaner than prior to contact with the above fluid.

The foregoing examples are illustrative of the present invention, and are not to be construed as limiting thereof. The invention is defined by the following claims, with equivalents of the claims to be included therein.

That which is claimed is:

1. A process for separating a contaminant from a substrate that carries the contaminant comprising:

contacting said substrate with a carbon dioxide fluid containing an amphiphilic species so that said contaminant associates with said amphiphilic species and becomes entrained in said carbon dioxide fluid, said substrate being selected from the group consisting of metals, ceramics, glass, and composite mixtures thereof; and then separating said substrate from said carbon dioxide fluid having said contaminant entrained therein.

2. A process according to claim 1, wherein said fluid comprises supercritical carbon dioxide.

3. A process according to claim 1, wherein said fluid comprises liquid carbon dioxide.

4. A process according to claim 1, wherein said fluid comprises gaseous carbon dioxide.

5. A process according to claim 1, wherein said contaminant is selected from the group consisting of inorganic compounds, organic compounds, polymers, and particulate matter.

6. A process according to claim 1, wherein said amphiphilic species comprises a $CO_2$-philic segment.

7. A process according to claim 6, wherein said amphiphilic species comprises a $CO_2$-phobic segment.

8. A process according to claim 6, wherein the $CO_2$-philic segment is a polymer comprising monomers selected from the group consisting of fluorine-containing segments and siloxane-containing segments.

9. A process according to claim 6, wherein the $CO_2$-phobic segment is a polymer comprising monomers selected from the group consisting of styrenics, α-olefins, ethylene and propylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof.

10. A process according to claim 8, wherein said siloxane-containing segments are selected from the group consisting of alkyl siloxanes, fluoroalkyl siloxanes, chloroalkyl siloxanes, dimethyl siloxanes, polydimethyl siloxanes, and mixtures thereof.

11. A process according to claim 1, wherein said amphiphilic species is selected from the group consisting of poly(1,1'-dihydroperfluorooctyl acrylate)-b-(poly)styrene, poly(1,1'-dihydroperfluoro octyl acrylate-b-styrene), poly(1,1'-dihydroperfluoro octyl acrylate-b-methyl methacrylate), poly(1,1'-dihydroperfluorooctyl acrylate-b-vinyl acetate), poly(1,1'-dihydroperfluorooctyl acrylate-b-vinyl alcohol), poly(1,1'-dihydroperfluorooctyl methacrylate-b-styrene), poly(1,1'-dihydroperfluoro octyl acrylate-co-styrene), poly(1,1'-dihydroperfluoro octyl acrylate-co-vinyl pyrrolidone), poly(1,1'-dihydroperfluorooctyl acrylate-co-2-ethylhexyl acrylate), poly(1,1'-dihydro perfluorooctyl acrylate-co-2-hydroxyethyl acrylate), poly(1,1'-dihydroperfluoro octyl acrylate-co-dimethyl aminoethyl acrylate), poly(styrene-g-dimethylsiloxane), poly(methyl acrylate-g-1,1'-dihydroperfluorooctyl methacrylate), poly(1,1'-dihydroperfluorooctyl acrylate-g-styrene), perfluoro octanoic acid, perfluoro(2-propoxy propanoic) acid, polystyrene-b-poly(1,1-dihydroperfluorooctyl acrylate), polymethyl methacrylate-b-poly(1,1-dihydroperfluorooctyl methacrylate), poly(2-(dimethylamino)ethyl methacrylate)-b-poly(1,1-dihydroperfluorooctyl methacrylate), a diblock copolymer of poly(2-hydroxyethyl methacrylate) and poly (1,1-dihydroperfluorooctyl methacrylate), and mixtures thereof.

12. A process according to claim 1, wherein said amphiphilic species is selected from the group consisting of perfluoro octanoic acid, perfluoro(2-propoxy propanoic) acid, fluorinated alcohols, fluorinated diols, fluorinated acids, ethoxylates, amides, glycosides, alkanolamides, quaternary ammonium salts, amine oxides, amines, and mixtures thereof.

13. A process according to claim 1, wherein said carbon dioxide fluid comprises a co-solvent.

14. A process according to claim 13, wherein said co-solvent is selected from the group consisting of methane, ethane, propane, ammoniumbutane, n-pentane, hexanes, cyclohexane, n-heptane, ethylene, propylene, methanol, ethanol, isopropanol, benzene, toluene, xylenes, chlorotrifluoromethane, trichlorofluoromethane, perfluoropropane, chlorodifluoromethane, sulfur hexafluoride, nitrous oxide, N-methyl pyrrolidone, acetone, organosilicones, terpenes, paraffins, and mixtures thereof.

15. A process according to claim 13, wherein said co-solvent is selected from the group consisting of methanol, ethanol, isopropanol, N-methyl pyrrolidone, and mixtures thereof.

16. A process according to claim 1, wherein said carbon dioxide fluid comprises an aqueous solution.

17. A process according to claim 1, wherein said carbon dioxide fluid comprises an additive selected from the group consisting of bleaching agents, optical brighteners, bleach activators, corrosion inhibitors, builders, chelants, sequestering agents, enzymes, and mixtures thereof.

18. A process according to claim 1, wherein said carbon dioxide fluid includes a co-surfactant.

19. A process according to claim 18, wherein said co-surfactant is selected from the group consisting of octanol, decanol, dodecanol, cetyl alcohol, laurel alcohol, diethanolamides, amides, amines, and mixtures thereof.

20. A process according to claim 1, further comprising the step of contacting said substrate with a pre-treatment formulation prior to said step of contacting said substrate with said carbon dioxide fluid so as to facilitate removal of said contaminant.

21. A process for separating a contaminant from a substrate that carries the contaminant comprising:

contacting said substrate with a carbon dioxide fluid containing an amphiphilic species so that said contaminant associates with said amphiphilic species and becomes entrained in said carbon dioxide fluid, said substrate being selected from the group consisting of metals, ceramics, glass, and composite mixtures thereof.

22. A process according to claim 21, wherein said fluid comprises supercritical carbon dioxide.

23. A process according to claim 21, wherein said fluid comprises liquid carbon dioxide.

24. A process according to claim 21, wherein said fluid comprises gaseous carbon dioxide.

25. A process according to claim 21, wherein said contaminant is selected from the group consisting of inorganic compounds, organic compounds, polymers, and particulate matter.

26. A process according to claim 21, wherein said amphiphilic species comprises a $CO_2$-philic segment.

27. A process according to claim 26, wherein said amphiphilic species comprises a $CO_2$-phobic segment.

28. A process according to claim 26, wherein the $CO_2$-philic segment is a polymer comprising monomers selected from the group consisting of fluorine-containing segments and siloxane-containing segments.

29. A process according to claim 21, wherein said carbon dioxide fluid comprises a co-solvent.

30. A process according to claim 29, wherein said co-solvent is selected from the group consisting of methane, ethane, propane, ammoniumbutane, n-pentane, hexanes, cyclohexane, n-heptane, ethylene, propylene, methanol, ethanol, isopropanol, benzene, toluene, xylenes, chlorotrifluoromethane, trichlorofluoromethane, perfluoropropane, chlorodifluoromethane, sulfur hexafluoride, nitrous oxide, N-methyl pyrrolidone, acetone, organosilicones, terpenes, paraffins, and mixtures thereof.

31. A process according to claim 29, wherein said co-solvent is selected from the group consisting of methanol, ethanol, isopropanol, N-methyl pyrrolidone, and mixtures thereof.

32. A process according to claim 21, wherein said carbon dioxide fluid includes an aqueous solution.

33. A process according to claim 21, wherein said carbon dioxide fluid includes a co-surfactant.

34. A process according to claim 33, wherein said co-surfactant is selected from the group consisting of octanol, decanol, dodecanol, cetyl alcohol, laurel alcohol, diethanolamides, amides, amines, and mixtures thereof.

* * * * *

UNITED STATES PATENT AND TRADEMARK OFFICE

CERTIFICATE OF CORRECTION

PATENT NO. : 5,866,005

DATED : February 2, 1999

INVENTOR(S) : Joseph M. DeSimone et al.

It is certified that error appears in the above-indentified patent and that said Letters Patent is hereby corrected as shown below:

Column 18, line 38, claim 9, "claim 6," should read --claim 7,--.

Signed and Sealed this

Twenty-eighth Day of September, 1999

Attest:

Q. TODD DICKINSON

Attesting Officer

*Acting Commissioner of Patents and Trademarks*